United States Patent [19]

McLennan

[11] Patent Number: 4,529,513
[45] Date of Patent: Jul. 16, 1985

[54] WASTE DIGESTION UNIT

[75] Inventor: Daniel McLennan, Pretoria, South Africa

[73] Assignee: Deico Mac International, Inc., San Diego, Calif.

[21] Appl. No.: 547,478

[22] Filed: Oct. 31, 1983

[51] Int. Cl.³ .............................................. C02F 3/02
[52] U.S. Cl. .................................. 210/219; 210/238; 210/298; 366/308
[58] Field of Search ............... 210/603, 613, 605, 630, 210/629, 179, 180, 188, 232, 238, 219, 298, 295; 366/308; 422/135

[56] References Cited

U.S. PATENT DOCUMENTS

| | | | |
|---|---|---|---|
| 871,046 | 11/1907 | Savage | 210/179 |
| 1,757,262 | 5/1930 | Sims | 210/188 |
| 1,841,435 | 1/1932 | Gibson | 366/308 |
| 2,520,540 | 8/1950 | Green | 210/188 |
| 3,559,962 | 2/1971 | Enssle | 366/308 |
| 3,865,721 | 2/1975 | Kaelin | 210/629 |
| 4,302,329 | 11/1981 | Pfefferkorn | 210/180 |

Primary Examiner—Barry S. Richman
Assistant Examiner—John Donofrio
Attorney, Agent, or Firm—McWilliams, Mann, Zummer & Sweeney

[57] ABSTRACT

A waste digestion unit which comprises a container, a waste inlet into the container, an outlet from the container for digested waste, a gas bleed outlet from the container and a stirrer for stirring the contents of the container. The inlet, waste outlet, bleed outlet and stirrer are arranged so that the container can be mounted in position and partially filled with waste to a level defined by the waste outlet to provide a gas space above the waste. In this position of the container the bleed outlet is above the waste level and, the inlet discharges into the container below the waste level. The stirrer is capable of stirring the waste at said waste level and below said waste level.

6 Claims, 7 Drawing Figures

WASTE DIGESTION UNIT

This invention relates to a waste digestion unit. In particular it relates to an anaerobic waste digestion unit suitable for treating human waste from one or more toilets.

According to the invention there is provided a waste digestion unit which comprises a container, at least one waste inlet into the container, an outlet from the container for digested waste, a gas bleed outlet from the container and a stirrer for stirring the contents of the container, the inlet(s), waste outlet, bleed outlet and stirrer being arranged so that the container can be mounted in position so that it can be partially filled with waste to a level defined by the waste outlet to provide a gas space above the waste, in which position of the container the bleed outlet is above the waste level and, each inlet discharges into the container below the waste level.

There may be a single waste outlet and several inlets, the stirrer being capable of stirring the waste at said waste level and below said waste level.

The container may be cylindrical in shape, having a cylindrical side wall, a circular end wall which provides a floor for the container, and a circular end wall which provides a roof for the container, the gas bleed outlet being through the roof and the waste outlet passing through the side wall closer to the roof than to the floor.

The stirrer may project into the interior of the container through the roof, the waste outlet including means defining a flow passage extending from the position where the waste outlet passes through the side wall towards the floor, the end of the flow passage extending from the position where the waste outlet passes through the side wall towards the floor, and end of the flow passage remote from said position being closer to the floor than to said position. The stirrer may be manually operable, comprising handle means outside the container, the stirrer projecting into the container from the handle means. The handle means may be a crank handle attached to a rotatable shaft which projects into the container, the shaft having several sets of impellers fast therewith and spaced along its length. The shaft may be rotatably mounted on a plate removably closing an opening into the container, the sets of impellers being movably attached to the shaft to facilitate insertion of the impellers on the shaft into the container through the opening.

The invention will now be described by way of example, with reference to the diagrammatic drawings, in which.

Figure 1:
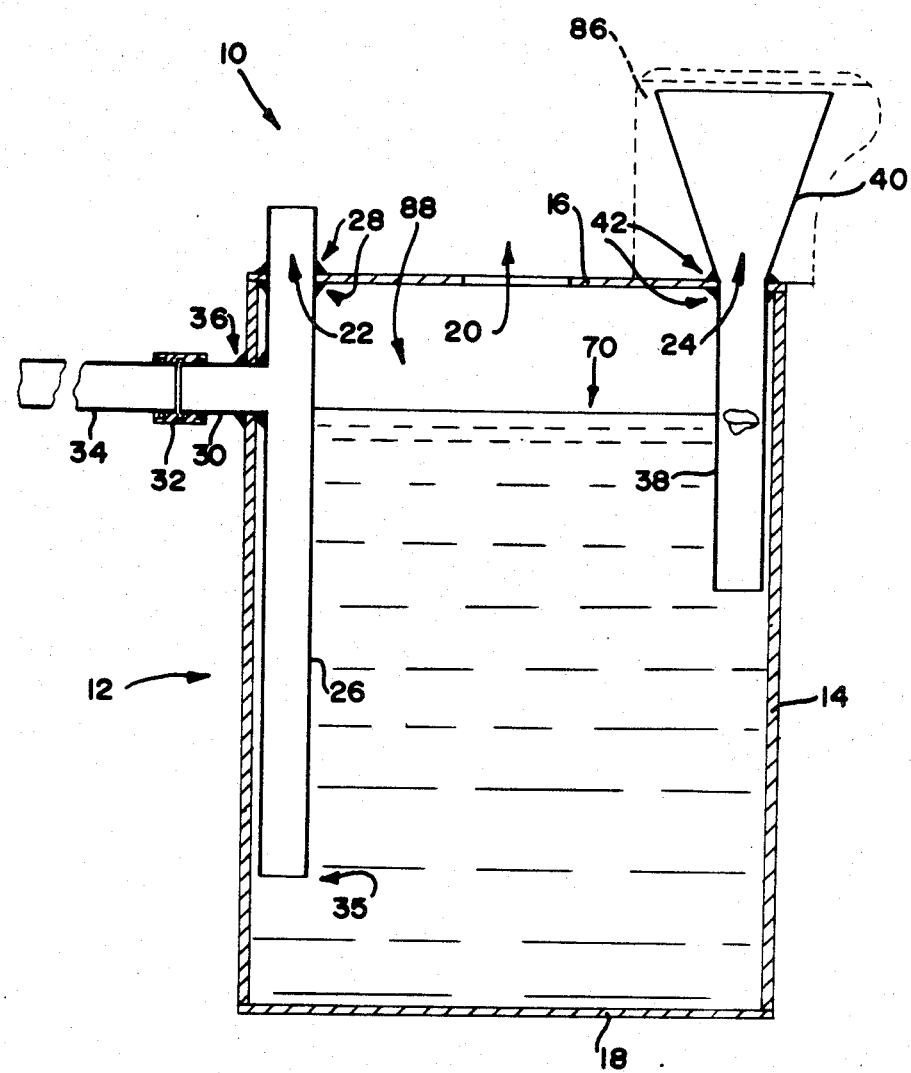
FIG. 1 shows a sectional side elevation of a waste digestion unit in accordance with the invention.

In FIG. 1 of the drawings, reference numeral 10 generally designates a waste digestion unit according to the invention. The unit 10 is suitable for small scale communal use, particularly in rural areas.

The unit 10 comprises a container 12 of cylindrical shape, having a cylindrical asbestos cement side wall 14, conveniently a length of asbestos cement pipe. The container 12 has a roof 16 and a floor 18, which are circular and also of asbestos cement. The roof and floor are secured to opposite ends of the side wall by polyurethane adhesive and by a plurality of circumferentially spaced self tapping screws (not shown) passing axially through said roof and floor and into the ends of the side wall. Typically, the container 12 can have a diameter of about 1200 mm, the asbestos cement being about 20 mm thick for adequate strength, and the drawings generally being drawn to scale.

Figure 2:
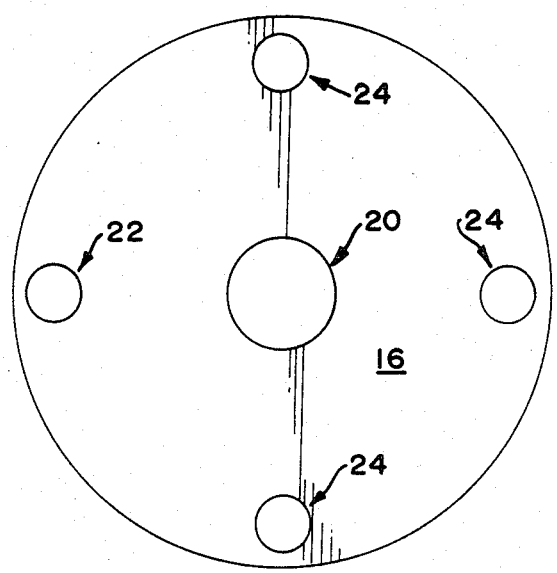
FIG. 2 shows a plan view of the roof of the unit of FIG. 1.

As shown with reference also to FIG. 2, the roof 16 has a central stirrer opening 20, and four equally circumferentially spaced peripheral openings, one of which, designated 22, is a breather opening, the others, designated 24, being inlet openings.

An asbestos cement pipe 26 extends longitudinally alongside the side wall 14, at one side of the container and inside the container, and passes through the breather opening 22, where it is held in place by epoxy cement as at 28. A branch pipe 30 projects at right angles from the pipe 26, and out through the side wall 14. It is shown connected by a coupling 32 to an external drainage pipe 34. The portion of the pipe 26 below the pipe 30 constitutes means defining a flow passage for digested waste leaving the container 12 and extends upwardly to the pipe 30 from its lower end 35, which is spaced above the floor 18 but which is located closer to said floor than to the pipe 30 or roof 16. The pipe 30 is also held in place by epoxy cement as shown at 36.

Each of the openings 24 is provided with an inlet pipe 38 (only the one diametrically opposite the opening 22 being shown in FIG. 1 for clarity of illustration). The upper end of each pipe 38, which is also asbestos cement, is provided with an asbestos cement inlet funnel 40. The pipe 38 and funnel 40 are held in position in their hole 24 by epoxy cement at 42, where the funnel 40 joins the pipe 38. The pipe 38 extends away from the funnel 40, parallel to the side wall 14, to terminate in a free end which is closer to the floor 18 than the pipe 30.

Figure 4:
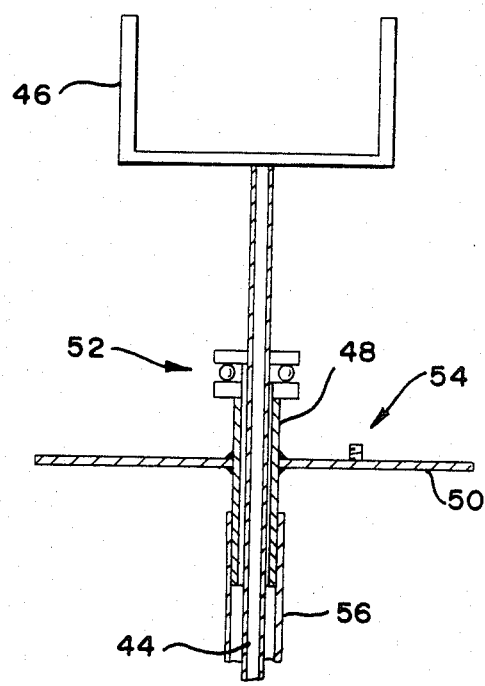
FIG. 4 shows a detail of the stirrer of FIG. 3.
Figure 3:
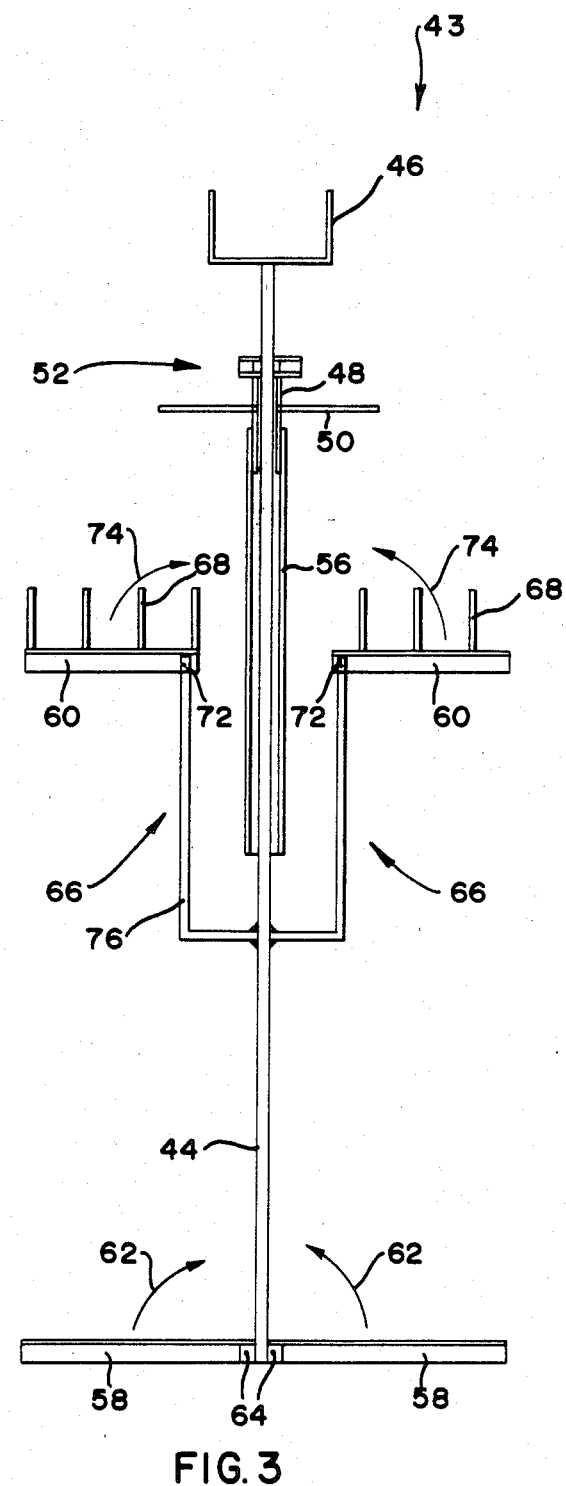
FIG. 3 shows a side elevation of the stirrer of the unit of FIG. 1.

With reference to FIGS. 3 and 4, a stirrer, generally designated 43, is shown for the container 12 of FIG. 1. The stirrer comprises a rotatably mounted shaft 44 having a double crank handle 46 at its upper or outer end. The shaft 44 passes through a tube 48 extending concentrically through a circular plate 50, being supported on the upper end of the tube 48 by a thrust bearing 52. The plate has a gas bleed nipple 54 and is bolted over the central opening 20 in the roof 16 (FIG. 1) by a series of circumferentially spaced bolts (not shown), being provided with a suitable seal or gasket, eg rubber, to seal the closure of said opening. A cylindrical sleeve 56 fits frictionally over the lower end of the tube 48 and extends downwardly around the shaft 44, its lower end being at a level below the level of the pipe 30 (FIG. 1).

The shaft 44 has two sets or pairs of impellers designated respectively 58 and 60, spaced along its length. The impellers 58 are connected to the lower end of the shaft 44, which is close to the floor 18. The impellers 58 are angle section lengths which project diametrically oppositely outwardly from the shaft 44 and are pivotable in the direction of arrows 62 about axes 64 normal to the shaft 44, away from their positions shown in FIG. 3 to positions alongside the shaft.

The impellers 60 in turn are also angle section lengths which project diametrically oppositely outwardly away from each other. They are mounted at the top of cranked brackets 66 fast with the shaft 44 below the sleeve 56 and have prongs or tines 68 spaced along their lengths and projecting upwardly therefrom. The impellers 60 are located just below the fluid level 70 of the container (FIG. 1—described in more detail hereunder) and the upper ends of said prongs project above said fluid level. The impellers 60 in turn are pivotally connected to the brackets 66 about axes 72 normal to the shaft 44, and are pivotable in the direction of arrows 74, away from their positions shown in FIG. 3 to positions parallel to the shaft 44. The spacing between the upright limbs 76 of the brackets 66 is such that they and the impellers 60 when folded can pass through the opening 20 (FIG. 1).

Figure 5:
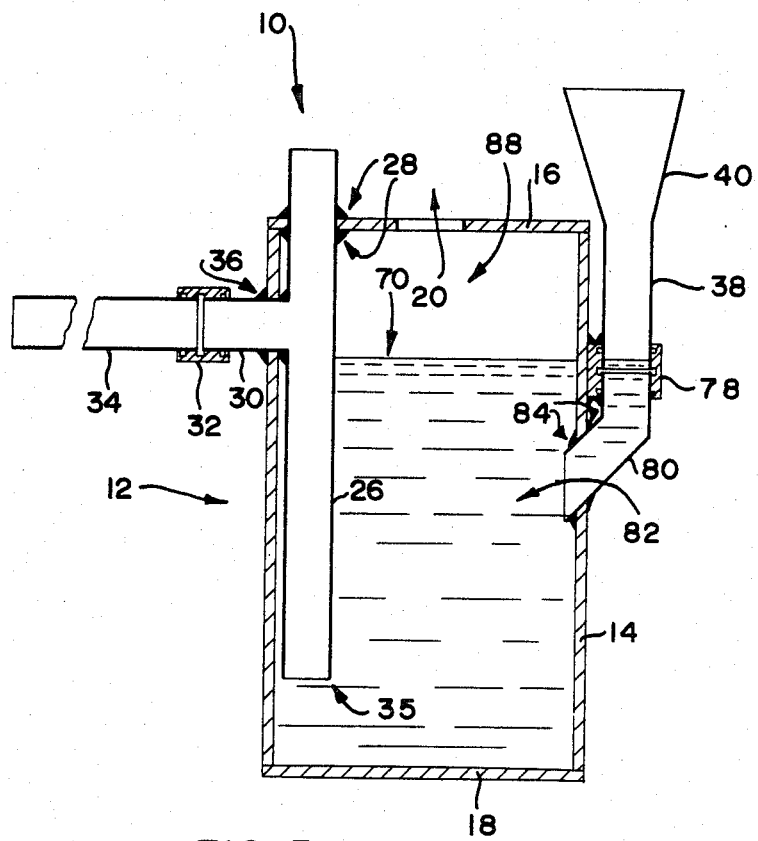
FIG. 5 shows a sectional side elevation of another waste digestion unit in accordance with the invention.
Figure 6:
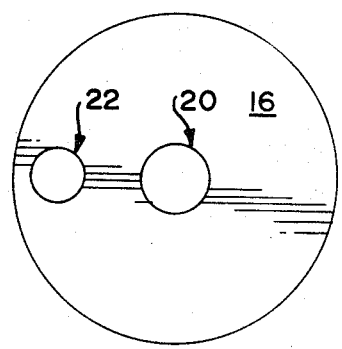
FIG. 6 shows a plan view of the roof of the unit of FIG. 5.
Figure 7:
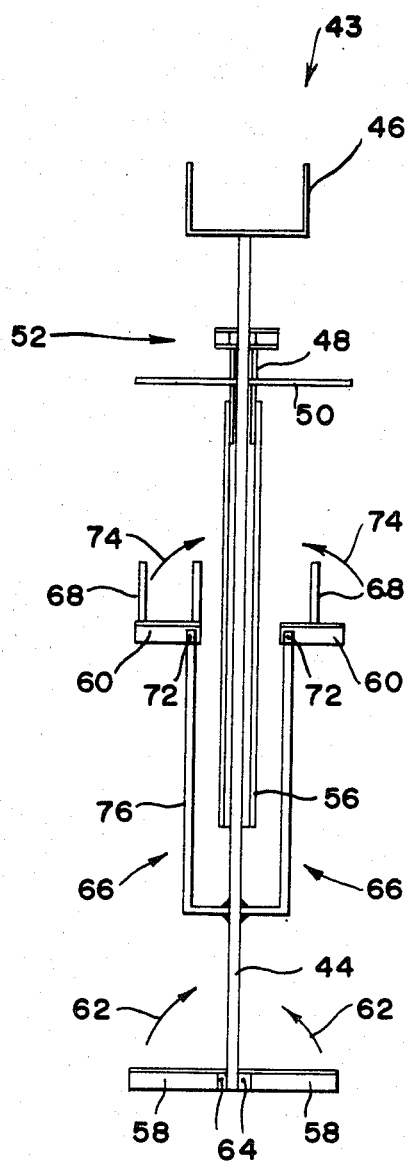
FIG. 7 shows a side elevation of the stirrer of the unit of FIG. 5.

FIGS. 5, 6 and 7 in turn show a smaller unit than that of FIGS. 1 to 4, more suitable for single family use than for communal use. The units are however essentially similar, and unless otherwise specified, the same reference numerals are used to show the same parts.

In FIG. 5, the openings 24 in the roof are omitted, and a single pipe 38 extends externally downwardly alongside the container 12 and is connected at its lower end by a coupling 78 to the upwardly facing end of a bend or elbow 80 which passes through an inlet opening 82 into the side wall 14 of the container 12, where it is held in position by epoxy cement as at 84. The opening 82 is below the level of the pipe 30.

The construction of the stirrer 42 of FIG. 7 is essentially similar to that of FIG. 3 but is merely smaller, the impellers 58 and 60 being shorter than the impellers 60 having fewer prongs.

In use, the gas bleed nipple is provided with a gas pipe (not shown) which extends over the top of the roof 16 and down into the top of the pipe 26 to end below the level of the pipe 30; and each funnel 40 is provided with a piston-type plunger (also not shown).

In use, typically in a rural area, the container 12 is sunk into the ground, and a toilet building is built over it. In the case of FIG. 1 the building will have three enclosures, each provided with a toilet seat over one of the funnels 40 (as shown in broken lines at 86 in FIG. 1), or one of the seats may be replaced by a urinal. The pipe 26 will vent externally. In the case of FIG. 5 there will be a single seat and enclosure. The pipe 34 will lead to a holding tank, french drain or the like.

To start operation of the unit, it will be filled with water to the level 70 of the pipe 30, ie until water starts to overflow from the container 12 via the pipe 30 under gravity. Use of the toilet(s) or urinal(s) will then lead within a short time to the build up of a population of anaerobic bacteria in the container 12, for anaerobic digestion of waste in the container.

Waste will enter the container via the funnels 40, assisted by their plungers if necessary. It will issue from the bottoms of the pipes 38 and will then to float at the fluid level 70. From this fresh waste at the top there will be a spectrum of waste over the depth of the container 12, with undigested waste at the top, fully-digested waste at the bottom, and partially digested waste inbetween. Combustible gas will collect in the gas space 88 above the level 70. As undigested waste enters the container, fully digested waste will issue via the pipes 26 and 30. Gas will issue via the nipple 54 and the attached pipe into the pipe 26 below the level 70, and thence it will vent via the top of the pipe 26. However, if required for combustion purposes this gas can be led away for use or storage via the pipe connected to the nipple 54.

It should be noted that although the gas space 88 is not substantially pressurized, it is effectively sealed off from the exterior of the container by the pipes 38 and 26, the sleeve 56 and the gas pipe from the nipple 50 which all extend below liquid level 70 so that there is an effective liquid seal. The space need however not be fully airtight and small scale leakage, eg between the shaft 44 and tube 48 via the bearing 53 is contemplated as being acceptable provided insufficient air can enter the gas space 88 adversely to affect the active growth of the anaerobic bacteria in the container 12. In this regard contact via the pipes 26 and 38 of air with waste in the container 12 is negligible and does not affect the functioning of the system as a substantially air-free and anaerobic system.

To ensure adequate mixing of the waste in the container 12, to promote an even spready of anaerobic bacteria therethrough, the stirrer 43 should be operated more or less frequently, eg at least once a day and preferably whenever a toilet or urinal is used. A few rotations of the shaft 44 by the handle 46 causes adequate mixing, the impellers 58 stirring up bacteria-rich fully digested waste from the bottom of the container and the impellers 60 with their prongs 68 breaking up such crust as may tend to form on the fluid surface at the level 70.

An advantage of the invention is that it provides a robust, simple, inexpensive and trouble-free waste digester suitable for rural use, which is simple and easy to operate. Digested waste issuing from the unit comprises a nutrient-rich aqueous solution suitable for agricultural use, a substantial proportion of potentially harmful organisms in the waste having been killed by the anaerobic operation of the unit. Furthermore, if desired, gas produced by the unit can be used for combustion purposes.

I claim:

1. A waste digestion unit which comprises a container, at least one waste inlet into the container, an outlet from the container for digested waste, a gas bleed outlet from the container and a stirrer comprising a rotatable shaft projecting into the interior of the container for stirring the contents of the container, each inlet, the waste outlet, the bleed outlet and the stirrer being arranged so that the container can be mounted in position so that it can be partially filled with waste to a level defined by the waste outlet to define a gas space above the waste, in which position of the container the bleed outlet is above the waste level, each inlet discharges into the container below the waste level, and the shaft of the stirrer projects downwardly into the interior of the container, the shaft having manually operable handle means attached thereto above the container and being mounted on a closure removably closing an opening into the container, the shaft having at least two impellers spaced along its length in the interior of the container, including one impeller adjacent the bottom of the container and one impeller which is adjacent said waste level and comprises a plurality of crust breakers spaced radially from the shaft at least some of which are at different distances from the shaft, the crust breakers being provided by a plurality of prongs projecting from the impellers in an upwardly direction substantially parallel to the shaft intersecting said waste level and at least some of the crust breakers being located at positions spaced radially further from the shaft than the periphery of the opening through which the shaft projects into the container, the impellers being movably attached to the shaft to facilitate insertion of the impellers into the container through said opening.

2. A unit as claimed in claim 1, in which there is a single waste outlet and several inlets.

3. A unit as claimed in claim 1, in which the handle means is a crank handle and in which the closure means closing the opening into the container is a plate.

4. A unit as claimed in claim 1, in which the impellers are elongated and are pivotally connected to the shaft about axes about which they are pivotable from operative positions in which they extend substantially radially relative to the shaft, to inoperative positions in which they extend substantially parallel to the shaft.

5. A unit as claimed in claim 1, in which the container is cylindrical in shape, having a cylindrical side wall, a circular end wall which provides a floor for the container, and a circular end wall which provides a roof for the container, the gas bleed outlet being through the roof and the waste outlet passing through the side wall closer to the roof than to the floor.

6. A unit as claimed in claim 5, in which the stirrer projects into the interior of the container through the roof, the waste outlet including means defining a flow passage extending from the position where the waste outlet passes through the side wall towards the floor, the end of the flow passage remote from said position being closer to the floor than to said position.

* * * * *